United States Patent [19]
Schiel

[11] Patent Number: 5,338,279
[45] Date of Patent: Aug. 16, 1994

[54] HYDROSTATICALLY SUPPORTED SAG-COMPENSATION ROLL, IN PARTICULAR FOR PAPER MANUFACTURING MACHINES

[75] Inventor: Christian Schiel, Heidenheim, Fed. Rep. of Germany

[73] Assignee: J.M. Voith GmbH, Fed. Rep. of Germany

[21] Appl. No.: 30,150

[22] PCT Filed: Jul. 10, 1992

[86] PCT No.: PCT/EP92/01562
§ 371 Date: Mar. 12, 1993
§ 102(e) Date: Mar. 12, 1993

[87] PCT Pub. No.: WO93/01351
PCT Pub. Date: Jan. 21, 1993

[30] Foreign Application Priority Data
Jul. 12, 1991 [DE] Fed. Rep. of Germany ....... 4123115

[51] Int. Cl.$^5$ .............................................. B30B 3/04
[52] U.S. Cl. .............................................. 492/7; 492/2
[58] Field of Search ................ 492/7, 2, 16–20; 162/358, 361; 100/162 B

[56] References Cited

U.S. PATENT DOCUMENTS

| Re. 32,586 | 2/1988 | Schiel et al. ............ 100/162 B |
| 3,802,044 | 4/1974 | Spillmann et al. . |
| 3,846,883 | 11/1974 | Biondetti . |
| 4,685,183 | 8/1987 | Justus ............................ 492/7 |
| 4,691,421 | 9/1987 | Schiel .................... 100/155 R |
| 4,751,775 | 6/1988 | Kubik ............................ 492/7 |
| 4,815,183 | 3/1989 | Bondetti ................. 100/162 B |
| 4,827,584 | 5/1989 | Pav et al. ..................... 492/7 |
| 4,852,229 | 8/1989 | Crouse ......................... 492/7 |
| 5,033,176 | 7/1991 | Schiel .......................... 492/7 |
| 5,206,978 | 5/1993 | Pav .............................. 492/7 |

FOREIGN PATENT DOCUMENTS 2011555 7/1979 United Kingdom .
2041161 9/1980 United Kingdom .

Primary Examiner—Irene Cuda
Attorney, Agent, or Firm—Ostrolenk, Faber, Gerb & Soffen

[57] ABSTRACT

The invention relates to a sag-compensation roll having a roll shell (1), a stationary yoke (2), and an oblong hydrostatic pressure shoe (8) which can be tilted about a longitudinal axis and contains hydrostatic pressure pockets (11, 12). The pressure shoe is fitted to the inside diameter of the roll shell (1) and is attached to a radially movable oblong piston (4) which is sealed off from the yoke (2). The longitudinal ridges (9, 10) which define the individual hydrostatic pockets (11, 12) have a width (a, b) equal to at most 1/20 of the width (K) of the piston. The pressure shoe (8) is hydraulically supported over the main part of its width on its lower side, i.e. the side which faces the yoke (2).

20 Claims, 4 Drawing Sheets

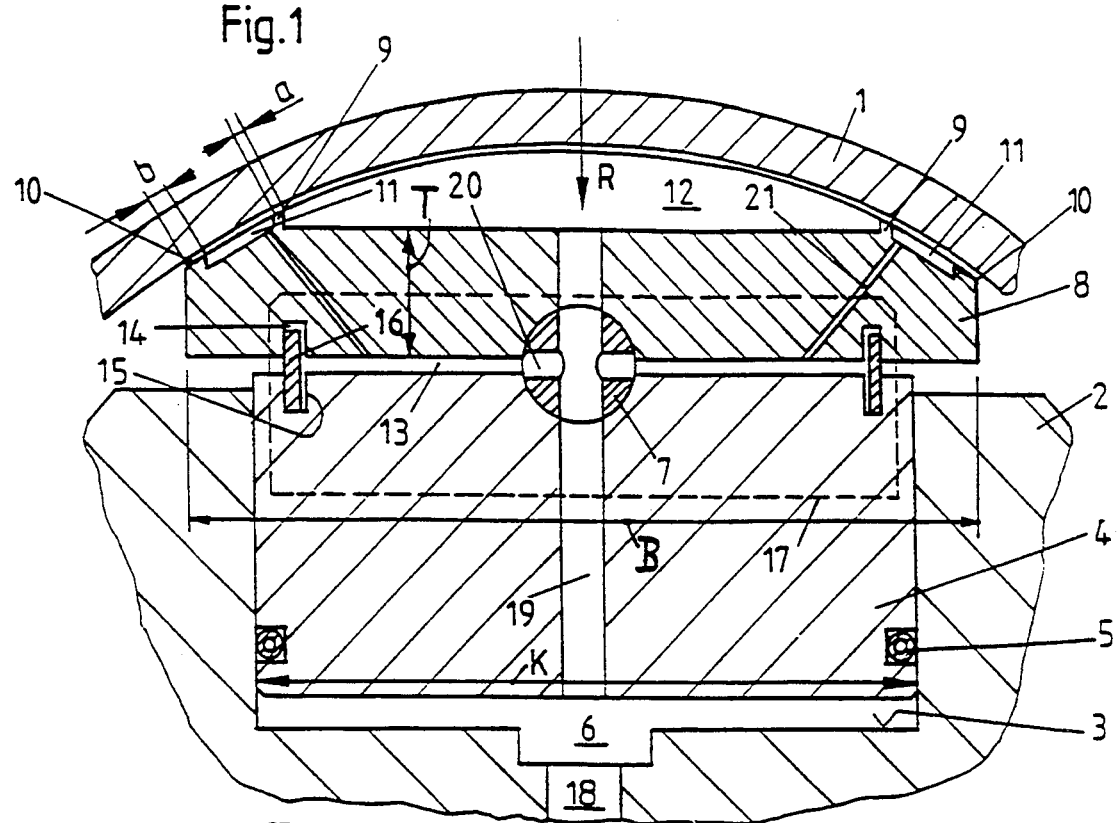
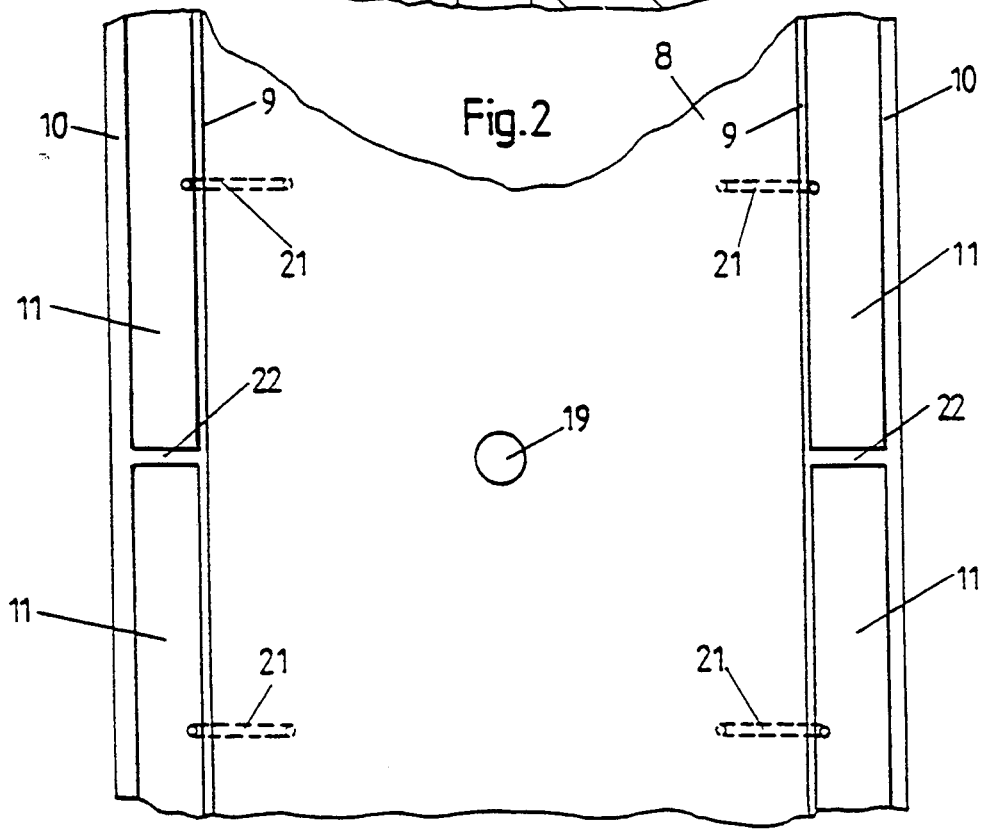

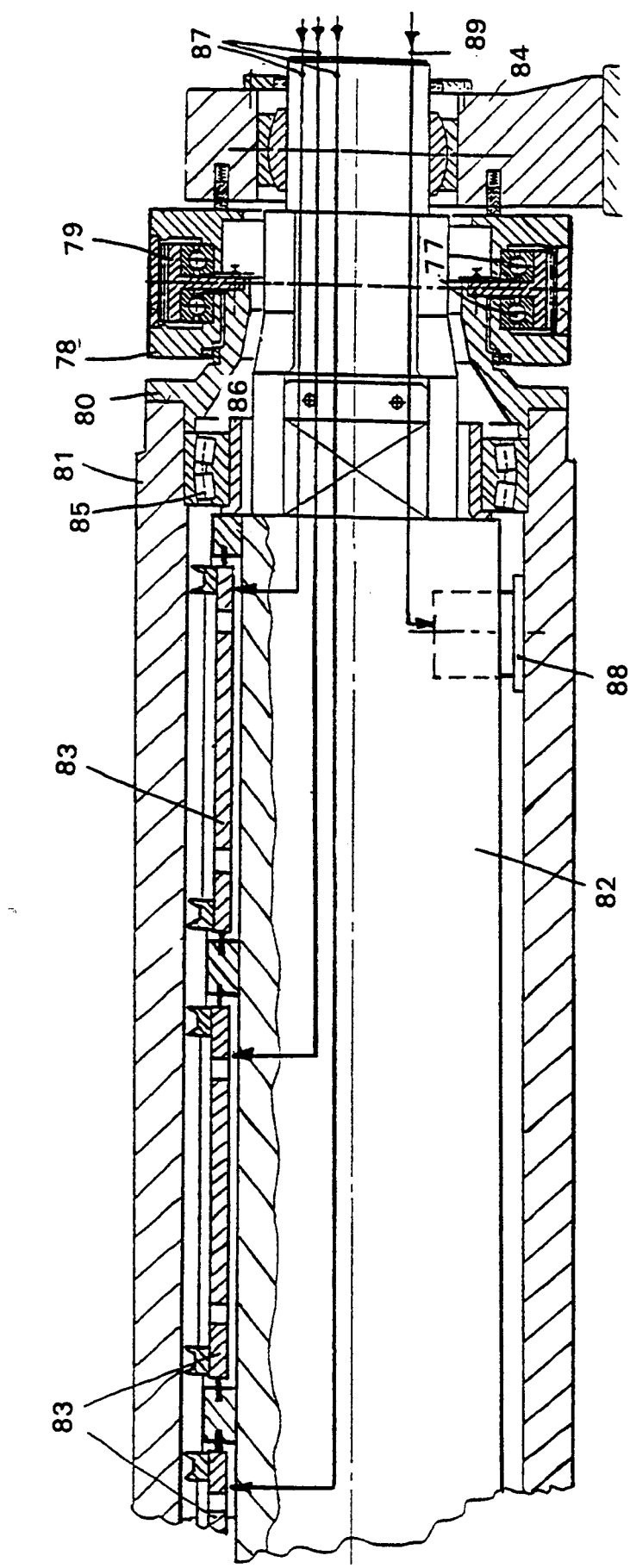

HYDROSTATICALLY SUPPORTED SAG-COMPENSATION ROLL, IN PARTICULAR FOR PAPER MANUFACTURING MACHINES

The present invention relates to a sag-compensation roll for treating a traveling web of paper, which roll includes a roll having a rotatable roll shell and a stationary yoke as well as at least one radially displaceable oblong pressure shoe for transmitting a pressing force from the roll shell to the yoke.

The pressure shoe has pressure pockets which are defined by surrounding ridge surfaces which fit the contour of the inner surface of the roll shell. By means of a flow of oil conducted into the pressure pockets a slot is produced between the shell and the ridge surfaces through which slot the oil discharges.

Rolls which, for instance, have a plurality of pressure shoes distributed over the width of the ridge (i.e. length of the roll) are already known, for instance, from Federal Republic of Germany 22 45 597 (U.S. Pat. No. 3,846,883). Other known rolls have only a few and, in the extreme case, only a single oblong pressure shoe which extends parallel to the axis of the roll, for instance as shown in U.S. Pat. No. 3,802,044 (FIGS. 6 and 7) or in Federal Republic of Germany 25 02 161 (GB 1506801). In the latter development, the pressure shoe which contains the pressure pockets is pressed by a piston, via an articulated strip, against the shell of the roll. The roll shell contains a long, relatively wide central pocket which is surrounded on both sides by narrow positioning pockets.

The positioning pockets are divided in the longitudinal direction into several sections by intermediate ridges. Into each of these sections there debouches a capillary which extends from the central pocket, and through which flows amounts of oil which determine the width of the slot between the ridges and the shell of the roll. The inner line force exerted on the roll shell is determined by the product of piston width times hydraulic pressure on the piston.

One disadvantage of such hydrostatic rolls as compared with the conventional S roll (in accordance with U.S. Pat. No. 3,196,520) or a roll with slide-bearing shoe (in accordance with U.S. Pat. No. 3,726,338) is that the pressure fluid (oil) continuously escapes through the capillaries and slots. In this way, more is required in order to convey the pressure oil which continuously flows out, since the power increases in proportion to the product of the hydraulic pump pressure times the delivery flow.

Another disadvantage, of the above described prior art constructions is the power that must be provided to overcome significant so-called shearing forces that build up, as rotational speed increases, in the oil that is within the region of the narrow slots between the roll shell and the ridges of the hydrostatic elements.

The prior art attempted to reduce power consumption (reactive power) by, for instance, selection of a less viscous oil and narrower slots. In this connection, the capillaries then become so small that they become clogged by sporadically occurring particles of dirt. Furthermore, the ridges are able to scrape against the roll shell.

For these reasons, it is has become customary, since introduction of the hydrostatic sag-compensation rolls about 20 years ago, to make the ridge widths large and the pressures high, with the use of an oil of high viscosity, for instance VG 150 or VG 220. In this way, it was possible to limit the amounts of oil in the case of sufficiently large capillaries and slot widths, but a relatively high internal friction had to be tolerated.

The main object of the present invention is to develop a hydrostatically operating sag-compensation roll that enables the reactive power (namely pump delivery power plus power loss by internal friction) to be a fraction of values that are customary today.

Further objects of the present invention are a simple, cost-saving design and a uniform temperature distribution over the width of the ridge. Furthermore, dependable operation of all parts is assured and, in particular, the hydrostatic elements function in all positions of installation relative to the direction of gravity.

It is also important that pressure shoe sag be minimized when the pressure shoe is placed under load, so that the slot widths at the ridges (limiting the pressure pockets) change as little as possible.

Furthermore, the pressure shoe should weaken the cross section of the yoke as little as possible so that the diameter of the roll need not be made unnecessarily large cost and weight of the roll are reduced.

Finally, the pressure shoe should be thermally stable, i.e. it must not curve due to unequal heating of the ridges over the width of the machine as a result of accelerating heating in the zones of decreasing slot widths.

In accordance with the instant invention, the amount of pressure fluid escaping from the pressure pockets (and thus the pump drive power) is kept relatively low by the following measures: Instead of a large number of small pressure shoes, only a single oblong pressure shoe is used or only a few oblong pressure shoes arranged in a row are provided. They extend substantially parallel to the axis of the roll. In this way, the ratio between the total length of the ridges and the sum of the areas of the pressure pockets is kept relatively small. A further measure for reducing pump drive power is that the active width of the pressure space—relative to the inside diameter of the roll shell—unusually large so that a relatively low pressure of the pressure fluid is sufficient. In this connection, however, it is important to keep the total width of the pressure shoe as small as possible. In accordance with the invention, this total width amounts to at most 1.3 times the active width of the pressure space. This takes into account that the pressure shoe—due to the large active width shape of the pressure space—is of substantially plate shape. It is now important that the pressure shoe, despite this plate shape—as seen in cross section—experiences extremely little or no sag under load. The aforementioned limiting of the total width of the pressure shoe and hydraulic supporting of the lower side of the pressure shoe, namely the side facing the yoke, serves to achieve this specific object (as will be described in detail below). As a result of these measures it can be expected that the dimensional accuracy of all slots between the ridges and the roll shell is retained with high precision during machine operation, even in the case of relatively large changes in the line force.

Furthermore, the very slight width of the ridges is of decisive importance, the inner frictional loss of the roll being reduced thereby.

The surprising result is that despite extreme reduction of the ridge width, greater pump power is not necessary because, with the same ridge width and slot width, we have $v \sim p$ (laminar flow) and the power is $p \sim p \times v$, and therefore $P \sim p^2$ ($P$=pump power, $p$=pump pressure, $v$=delivery stream). For instance, by increasing the piston surface to three times its value, the required pressure, for the same line force, is reduced to ⅓ and the necessary pump power to 1/9, if the ridge widths remain the same size.

However, it is also possible, with the same pump power, to reduce the ridge width to 1/9, of the previous value, with correspondingly drastically reducing inner friction power drastically.

By such shaping of the hydrostatic pressure shoe—which at first appears illogical—an enormous reduction in the reactive power of a hydraulically supported sag-compensation roll is achieved.

In other words, both the pump power and the power for driving of the roll can be drastically reduced.

The above-mentioned hydraulic supporting of the lower side of the pressure shoe can be obtained in various ways. If the pressure shoe is attached by means of an articulated strip to a separate piston, a space which is sealed off from the rest of the inside of the roll is provided in accordance with the invention between the pressure shoe and the piston, with approximately the same pressure prevailing in said space as in the pressure space. The design of the instant invention can be substantially simplified by having the pressure shoe and the piston formed as single structural part; in other words, the pressure shoe is developed at the same time as the piston. In such case, the hydraulic supporting of the lower side of the pressure shoe is assured by the pressure prevailing in the pressure space. In all cases, the result is obtained that, due to at least approximately the same pressure on both sides (top and bottom sides) of the pressure shoe, sagging of the relatively wide show is avoided.

The tiltability of the single-piece pressure shoe, which is developed at the same time as piston, is obtained by a short guide length and piston bed in the region of the longitudinal seal. Sealing is effected either by resilient sealing lips or by rigid strips, in accordance for instance with U.S. Pat. No. 4,651,628 (File P 4183), in which case particular attention is to be paid in particular to the large stroke of the end seal.

The construction of the pressure shoe with wide central chamber and narrow outer hydraulic pockets (Federal Republic of Germany 25 02 161) is preferred. This construction is particularly advantageous in the case of a shoe having large width, since it is less sensitive to slot changes over the individual longitudinal ridges than a construction with one central ridge and two outer ridges.

A further reduction of the reactive power is obtained by having the inner ridges between a central chamber and hydrostatic pockets made narrower than the outer ridges. This can be done since the difference in pressure, and thus the flow of oil through these ridges, is small.

In a preferred embodiment, the outer ridges are about 1.5 to 2.5 times wider than the inner ridges.

Furthermore, hydrostatic pressure pockets provided with oil by capillaries are also provided at the ends of the pressure shoe. In this way, it is seen to it that the higher frictional power which occurs in an annular zone does not lead to local heating. The frictional heat is flushed away by the hydrostatic oil. These end strips are of a width similar to that of the longitudinal strips.

On the one hand, the pressure shoe should not be too bulky and heavy, while, on the other hand, sufficient flexural rigidity is necessary. The essentially plate-shaped pressure shoe should have a thickness amounting to 0.15 to 0.3 times its width, at least in the region of its center axis in order to satisfy the demands made upon it. In this way, on the one hand, the yoke is not too greatly weakened and on the other hand, the stiffness necessary for accurately maintaining the slot is present. The pressure shoe is then still sufficiently resilient over the width of the ridge (and therefore over its length) to adjust itself parallel to the shell of the roll under the action of the hydrostatic forces.

It is also advantageous to incorporate the hydrostatic pockets into strips which can be screwed on the pressure shoe. This applies both for the longitudinal strips and for the end strips which are in the form of a circular segment.

In order to minimize thermal bending, an insulating layer is inserted between the pressure shoe and the strip. This insulating layer is about 1 to 5 mm in thickness. It may consist of plastic or of resin-bonded fabric layers.

The main part of the pressure shoe is preferably made of steel, while the strips which are screwed onto it consist of a material having good sliding properties with respect to the roll shell, which is made of steel or cast iron.

If the pressure shoe is positioned to upward, then special pressing means are to be provided which bring it from its position of rest into the operating position touching the shell of the roll. In accordance with a further development of the invention, this is effected by pressing means which are independent of the hydraulic pressure, for instance by pretensioned springs.

If the pressing arrangement described is installed in a roll which is supported at equal distances (in accordance with U.S. Pat. No. Re 32,586) and which also may have the same distance between supports as the backing roll, and as several hydraulic pressure zones are unnecessary over the width of the web. Thus, the pressing device is simple and economical since only a single pressure shoe that extends over the entire width of the web is required.

If the pressing arrangement described is built into a self-pressing roll (in accordance with U.S. Pat. No. 4,691,421), then, as a rule, several pressure shoes distributed over the width of the web are provided, together with counterpressure shoes at the ends of the roll.

The invention will now be explained in further detail with reference to the accompanying drawings wherein:

FIG. 1 is a partial cross section through a sag-compensation roll with hydrostatic pressing arrangement.

FIG. 2 is a view of the arrangement of FIG. 1 seen in the direction indicated by the arrow R in FIG. 1.

FIG. 7 is a diagrammatic longitudinal section through a self-pressing sag-compensation roll.

Figure 6:
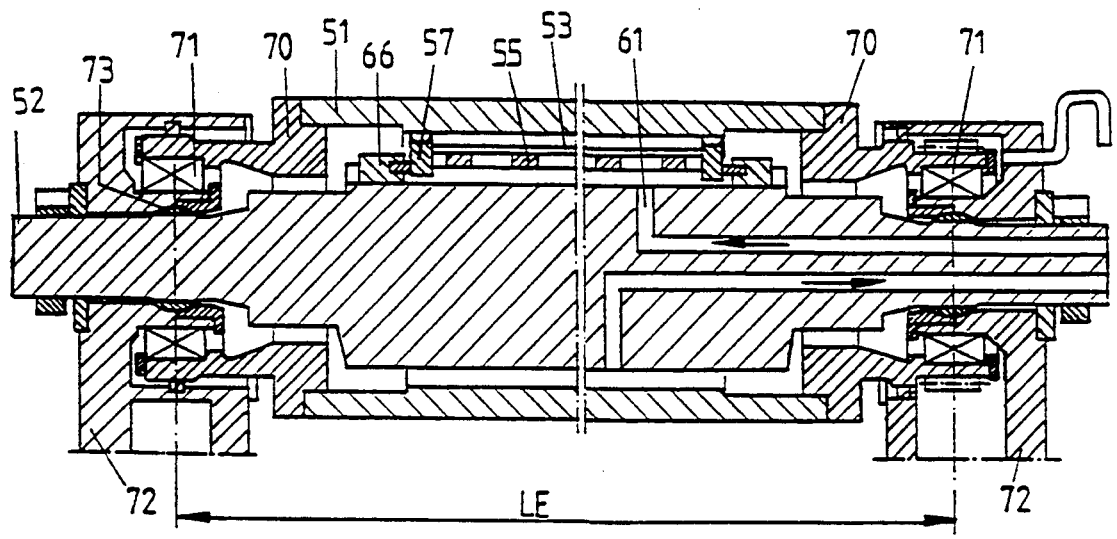
FIG. 6 is a diagrammatic longitudinal section through a sag-compensation roll supported at equal distances.

Referring to FIG. 1, reference numeral 1 indicates rotatably mounted roll shell which is passed through by a stationary yoke 2. In the yoke 2 there is incorporated an oblong bed 3 in which an oblong piston 4 can move up and down. Within the piston 4 there are installed elastic seals 5 which seal the pressure space 6 off from the outside. The active width K of piston 4 is equal to about 0.4 times the inside diameter of the roll shell 1.

A pressure shoe 8 (hereinafter also referred to as "shaped part") is tiltably mounted on a lengthy articulated strip or pivot pin 7 bedded in the piston 4. The total width B of shoe 8 is about 1.2 times the width K of the pressure space 6, and its thickness T is about 0.15 times the width B. The shaped part 8 bears two inner longitudinal ridges 9 and two outer longitudinal ridges 10, which form hydrostatic pockets 11 between each other. Between the ridges 9 there is a central chamber 12 in which substantially the same pressure prevails as in the pressure space 6. The width a of the inner longitudinal ridges 9 is about 1/80 of the width K of the pressure space 6, and the width b of the outer longitudinal ridges 10 is about 1/40 of the width K of the pressure space 6.

Between the piston 4 and the shaped part 8 there is another pressure space 13 which is sealed on its long side by sealing strips 16 held in grooves 14 and 15 and at its end by sealing plates 17 (shown in dashed line).

Through a feed line 18, a pressure agent passes into the pressure space 6 and, via one or more holes 19 (passing through the piston 4, the pivot pin 7, and the shaped part 8) into the central chamber 12. Via transverse holes 20 in the pivot pin 7, the pressure agent is directed into the pressure space 13 and, from the latter via the capillary holes 21, into the hydrostatic pockets 11.

As soon as the pressure in the hydrostatic pockets 11 has reached a certain value at which the sum of the hydraulic forces between roll shell 1 and shaped part 8 corresponds to the hydraulic force of the pressure agent in the space 6 on the piston 4, an oil-filled slot is formed between roll shell 1 and the ridges 9, 10 of the shaped part 8. In this way, there is assured wear-free travel of the shell 1. The roll shell 1 can turn either in clockwise or in counterclockwise direction. At both ends, the roll shell 1 is positioned in known manner relative to the yoke 2 by antifriction bearings, not shown.

In FIG. 2 there are transverse ridges 22 which separate the shaped part 8, the longitudinal strips or ridges 9 and 10, as well as adjacent hydrostatic pockets 11. Furthermore, a capillary 21 extends into each hydrostatic pocket 11. The addition of oil is effected through the hole 19.

Figure 3:
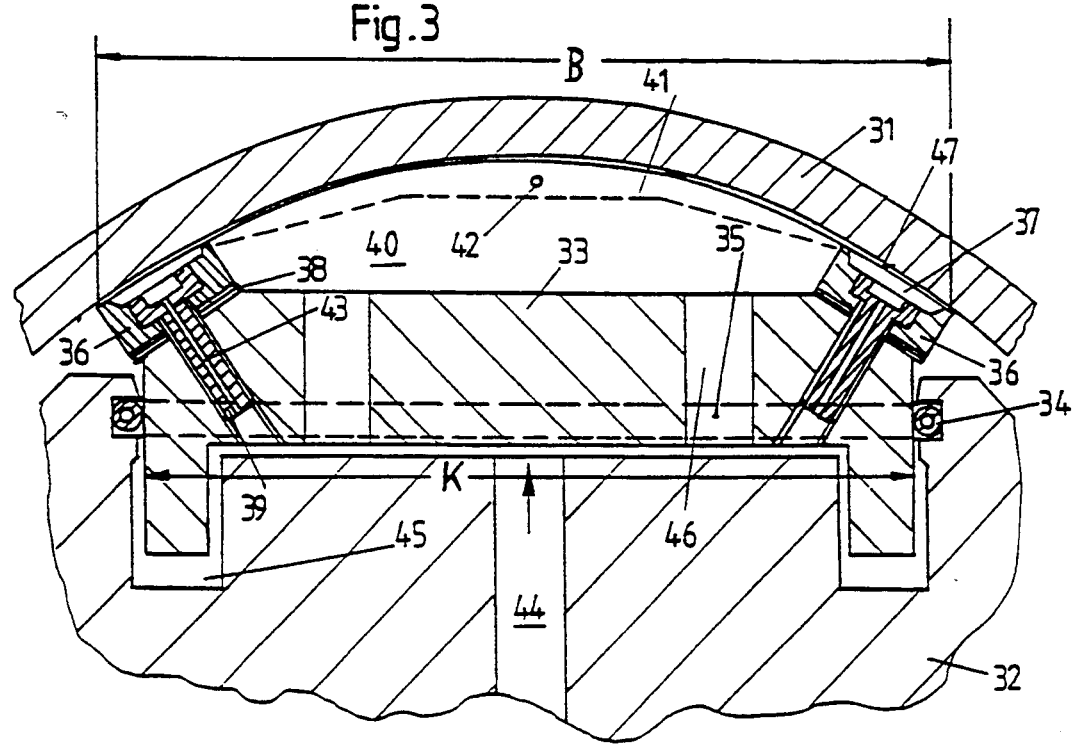
FIG. 3 is a partial cross section through another pressing arrangement.

In FIG. 3 a stationary yoke 32 is present within a rotatably mounted roll shell 31. Within the yoke 32 there is mounted a pressure shoe 33 which also has the function of a piston and which is vertically movable and is sealed off from the yoke 32 by resilient packings 34. Packings are also present at the end between the yoke 32 and pressure shoe 33, as indicated in dashed line at 35. Sealing strips 36 with hydrostatic pockets 37 worked in them are mounted by screws 39 onto the pressure shoe 33 with the interpositioning of a insulation board 38.

Sealing strips 40 are screwed at both ends on the pressure shoe 33. Hydrostatic pockets 41 (shown in dashed line) are worked also into these sealing strips 40, they and are supplied with a pressure agent via capillaries 42. The hydrostatic pockets 37 are filled with a pressure agent through capillary holes 43 that extend longitudinally through some of the attachment screws 39. The pressure agent passes through the feed hole 44 into the pressure space 45 and, via openings 46, up to the roll shell 31. The total width B of the pressure shoe 33 is about 1.1 times the active width K of the pressure space 45. In a manner similar to that found in the structure of FIG. 2, hydrostatic pockets 37 are divided by intermediate ridges 47 into several sections over the width of the ridge.

FIG. 4 again shows a rotatable supported roll shell 51 and a yoke 52, in a partial sectional view.

Sealing strips 53 with hydrostatic pockets 54 worked therein are connected by an intermediate plate 55 and screws 56. End sealing plates 57 are also screwed to the sealing strips 53 by fastening screws, not shown in the drawing. The intermediate plate 55 has either pressure-agent holes 58 or consists of several parts, with intermediate spaces.

Packings 59 prevent the emergence of a pressure agent between yoke 52 and sealing strips 53.

Springs 60 press the pressure shoe, consisting of the parts 53 to 56, against the roll shell 51.

The spring force of the springs 60 is so dimensioned that it compensates for the weight of the parts 53–56 and overcomes the sealing friction.

Pressure agent passes through a pressure-agent line 61 into the pressure space 62 and, via capillary holes 63, into the hydrostatic pockets 54.

In FIG. 5, one can again note the rotatably mounted roll shell 51, the yoke 52, sealing strips 53 and end packing 57, as well as the intermediate plate 55, developed in the form of individual square bars 55'.

A horizontally movable end sealing strip 64, guided in a sealing-strip holder 66 fastened on the yoke 52, is pressed by springs 65 against the end packing 57. The pressure agent passes through the feed line 61 into the pressure space 62 and, through capillaries 63, into the hydrostatic pockets 54 (not visible) of the longitudinal sealing strips 53 and, via capillaries 67, into the hydrostatic pockets 68.

Figure 4:
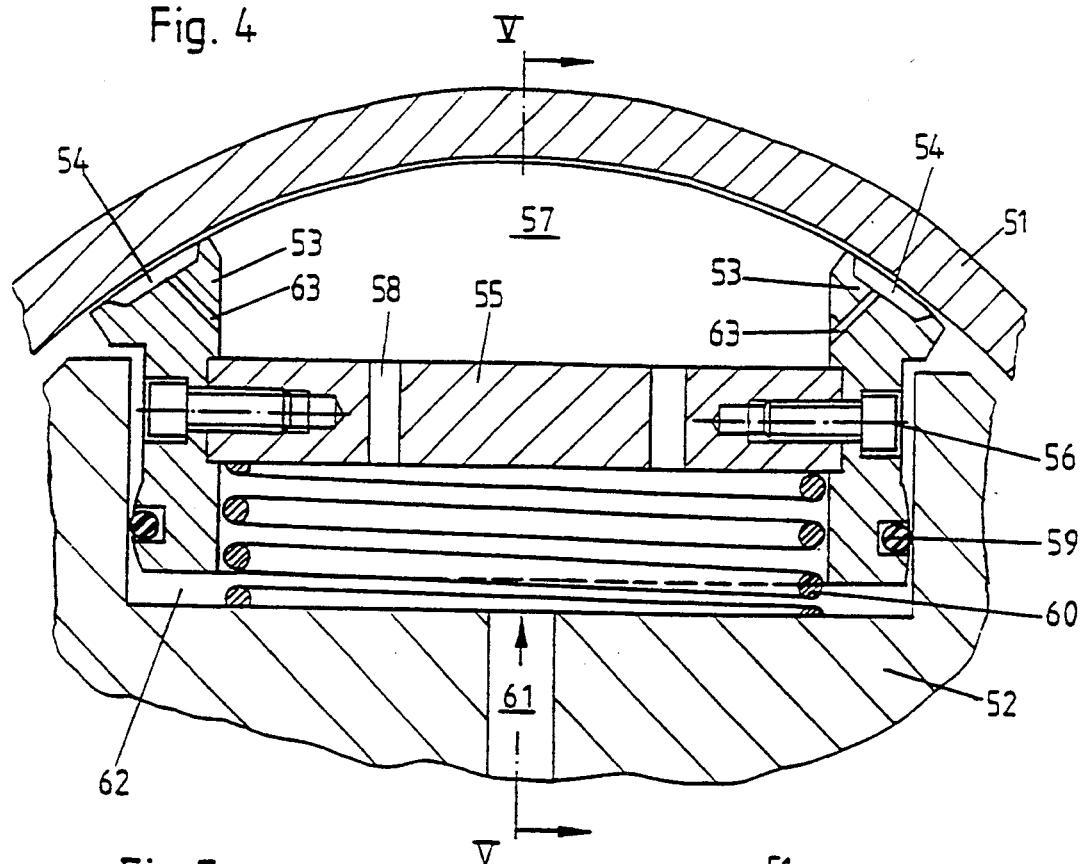
FIG. 4 is an alternative to FIG. 3.

As an alternative to the springs 60 shown in FIG. 4, the first lifting of the pressure unit can also be effected by fluid pressure. That is upon placing the apparatus in operation, the hole 19 (FIG. 1) is briefly reduced in size or closed with the aid of a time-controlled valve or the like.

As an alternative, for this purpose, separate oil feeds may be provided into the spaces 6 and 12 of FIG. 1. The spaces 13 could alternatively also be connected with the pressure space 6 by direct holes rather than via the holes 19 and 20.

Figure 5:
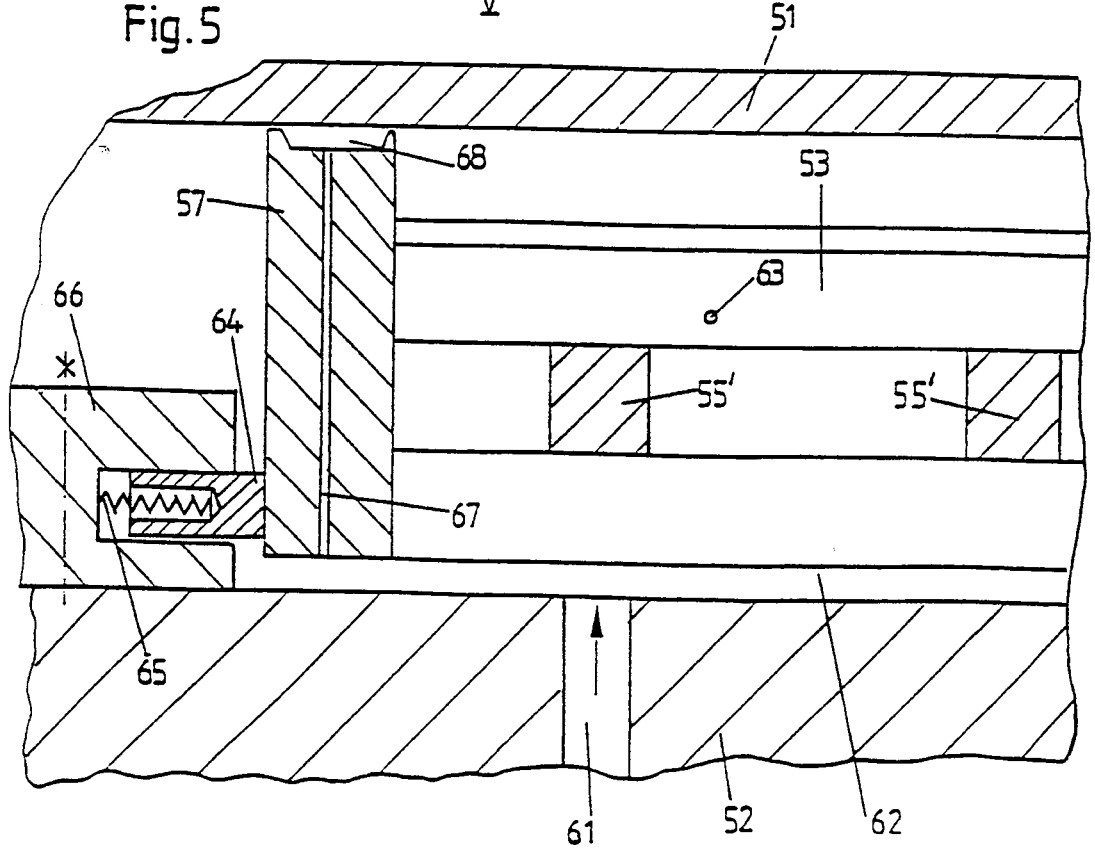
FIG. 5 is a longitudinal section along the section line V—V of FIG. 4.

FIG. 6 shows an equidistantly supported sag-compensation roll which corresponds substantially to that shown in FIGS. 4 and 5. A single oblong pressure shoe is present, of which the parts 53, 55' and 57 are visible.

The roll shell 51 is provided on each of its ends with a journal neck 70 which is mounted by means of antifriction bearing 71 in a supporting pedestal 72. The stationary yoke 52 rests by means of spherical bushings 73 on supporting pedestals 72. The distance LE between the central planes of the antifriction bearings 71 and the bushings 73 is the same. The other details are provided with the same reference numerals as the corresponding parts in FIGS. 4 and 5.

FIG. 7 shows a sag-compensation roll which differs from that in FIG. 6. In FIG. 7 a rotatable roll shell 81, a stationary yoke 82, and a plurality of oblong pressure shoes 83 are arranged in a row. A drive ring 80 and a toothed rim 79, which is fastened to it and meshes with a drive pinion (not visible in the drawing), rotates together with the roll shell 81. A gear housing 78 is mounted by means of antifriction bearings 77 on the toothed rim 79. The yoke 82 rests in a supporting pedestal 84. The roll shell 81 is mounted by means of an antifriction bearing 85 on a so-called sliding block 86.

The latter is not turnable, but is displaceable in radial direction relative to the yoke 82. Thus, the roll shell 81 can be pushed (together with the said parts 77–80) in radial direction relative to the yoke. It can, for example, be lifted off from a backing roll (not shown) and then applied to it and pressed against it again. Therefore, the roll shown in FIG. 7 is a so-call self-pressing roll. The end of the roll not visible in FIG. 7 is substantially of the same development as the visible end; only the drive elements 77 to 79 are missing. Differing from FIG. 6, the distance between the antifriction bearings 85 of the roll shell 81 is substantially less than the distance between the supports of the yoke 82 in the supporting pedestals 84. Therefore, it is advantageous for each pressure shoe 83 to be acted on with different pressures via separate pressure lines 87. Furthermore, at each roll end there is provided at least one counterpressure shoe 88 which is acted on by pressure via an additional pressure line 89.

I claim:

1. A sag-compensation roll, particularly for paper manufacturing machines, including:
   a) a rotatable roll shell (1), and a stationary yoke (2) disposed inside of said roll shell (1) and extending therethrough;
   b) said roll shell (1) having a rotational axis, an inside diameter, and an inner surface, at least one oblong pressure shoe (87, 33; 53–57) disposed between the roll shell (1) and the yoke (2), said pressure shoe having an outer contour which matches the inner surface of the roll shell, said shoe extending parallel to the rotational axis, said shoe being tiltable about its longitudinal axis and being movable radially with respect to the yoke;
   c) said pressure shoe including hydrostatic pressure pockets (11, 11) in its said outer contour for transmission of a pressing force from the roll shell (1) to the yoke (2);
   d) a pressure space (6; 45; 62) located between the pressure shoe and the yoke, said pressure space having an active width (K) measured between sidewalls of the pressure space (6; 45; 62) in a direction transverse to the length of the pressure shoe, said active width being at least 0.2 times the inside diameter of the roll shell (1);
   e) the pressure shoe (8; 33; 53–57) having a total width (B) that is at most 1.3 times the active width (K) of the pressure space;
   f) the pressure shoe (8; 33, 53–57) having a lower side facing the yoke (2), said lower side being hydraulically supported; and
   g) the pressure pockets (11, 12) being delimited by longitudinal ridges (9, 10) that have a width (a, b) equal to at most 1/20 of the active width (K) of the pressure space (6; 45; 62).

2. A sag-compensation roll according to claim 1, characterized by having the active width (K) of the pressure space (6; 45; 62) 0.25 to 0.5 times the inside diameter of the roll shell (1).

3. A sag-compensation roll according to claim 1, characterized by having the width (a, b) of the longitudinal ridges (9, 10) 1/30 to 1/100 of the active width (K) of the pressure space (6; 45; 62).

4. A sag-compensation roll according to claim 1, characterized by also including:
   a) an articulated strip (7) that attaches the pressure shoe (8) to a separate piston (4) which delimits the pressure space (6) from the rest of the inside of the roll;
   b) an intermediate space (13) between pressure shoe (8) and piston (4), said intermediate space (13) being sealed off from the rest of the inside of the roll, and pressure within said space (13) is equal approximately to pressure in the pressure space (6).

5. A sag-compensation roll according to claim 1, characterized by having the pressure shoe (33) act as a piston which delimits the pressure space (45) from the rest of the inside of the roll and is tiltable around a longitudinal axis in the pressure space (45).

6. A sag-compensation roll according to claim 1, characterized by having said narrow pressure pockets (11, 11) be machine-wide, be fed with oil via capillaries (21) and be arranged on both sides of a central chamber (12) that is of a width equal substantially to that of a machine in which said sag-compensation roll is installed.

7. A sag-compensation roll according to claim 6, characterized by having the width (b) of the outer ridges (10) between pressure pockets (11) and the inside of the roll greater than the width (a) of the inner ridges (9) between pressure pockets (11) and central chamber (12).

8. A sag-compensation roll according to claim 7, characterized by having the outer ridges (10) approximately twice as wide as the inner ridges (9).

9. A sag-compensation roll according to claim 1, characterized by the fact that pressure pockets (68) which are fed with oil via capillaries (67) are also provided at the end sides.

10. A sag-compensation roll according to claim 1, characterized by having the pressure shoe (8; 33) include a predominantly plate-shaped part having a ratio of thickness to width (T/W) seen in cross section of 0.15 to 0.33.

11. A sag-compensation roll according to claim 1, characterized by also including an oblong support body (33; 55), and strips (36; 53) containing pressure pockets (37; 54), said strips being mounted on said oblong support body (33; 55).

12. A sag-compensation roll according to claim 11, characterized by having an insulating layer (38) disposed between the strips (36) and the support body (33).

13. A sag-compensation roll according to claim 11, characterized by having the support body (33; 55) constructed of steel and the strips (36; 53) constructed of a material having superior slide properties with respect to steel or cast iron.

14. A sag-compensation roll according to claim 1, characterized by also including pressing means (60) to press the shoe (53–56) against the roll shell (51) in opposition to the force of gravity, even under pressure-less condition.

15. A sag-compensation roll according to claim 1, characterized by also including spaced bearings that support the rotatable roll shell (51) and other spaced bearings that support the stationary yoke (52), spacing between said spaced bearings and spacing between said other spaced bearings approximately equal and that only a single pressure shoe (53–57) being present, said single pressure shoe extending along the roll shell (51) for substantially its entire length.

16. A sag-compensation roll according to claim 1, characterized by the fact that the roll shell (81) is self-pressing and is displaceable radially relative to the yoke (82), and that there are a plurality of oblong pressure shoes (33) arranged in a row and having the pressure spaces wherein different pressures may be introduced (FIG. 7).

17. A sag-compensation roll according to claim 2, characterized by having the width (ab) of the longitudinal ridges (9, 10) 1/30 to 1/100 of the width (K) of the pressure space (6; 45; 62); and said pressure shoe (8; 33) including a predominantly plate-shaped part having a ratio of thickness to width (T/W) seen in cross section of 0.15 to 0.33.

18. A sag-compensation roll according to claim 8, characterized by also including a) an articulated strip (7) that attaches the pressure shoe (8) to a separate piston (4) which delimits the pressure space (6) from the rest of the inside of the roll;

b) an intermediate space (13) between pressure shoe (8) and piston (4), said intermediate space (13) being sealed off from the rest of the inside of the roll, and pressure within said space (13) is equal approximately to pressure in the pressure space (6).

19. A sag-compensation roll according to claim 14, characterized by having the roll shell (81) be self-pressing and displaceable radially relative to the yoke (82), there being a plurality of oblong pressure shoes (33) arranged in a row and having pressure spaces wherein different pressures may be introduced (FIG. 7).

20. A sag-compensation roll according to claim 7, characterized by having the pressure shoe (33) act as a piston which delimits the pressure space (45) from the rest of the inside of the roll and is tiltable around a longitudinal axis in the pressure space (45).

* * * * *